United States Patent
Kim

(10) Patent No.: US 9,147,290 B2
(45) Date of Patent: Sep. 29, 2015

(54) HEAD MOUNTED DISPLAY AND METHOD FOR CONTROLLING THE SAME

(71) Applicant: LG ELECTRONICS INC., Seoul (KR)

(72) Inventor: Jihyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 13/777,678

(22) Filed: Feb. 26, 2013

(65) Prior Publication Data

US 2014/0192085 A1 Jul. 10, 2014

(30) Foreign Application Priority Data

Jan. 4, 2013 (KR) ........................ 10-2013-0001107

(51) Int. Cl.
*G06T 19/00* (2011.01)
*G06F 3/01* (2006.01)
*G07B 11/00* (2006.01)
*G02B 27/01* (2006.01)

(52) U.S. Cl.
CPC ............ *G06T 19/006* (2013.01); *G02B 27/017* (2013.01); *G06F 3/011* (2013.01); *G07B 11/00* (2013.01); *G02B 2027/014* (2013.01); *G02B 2027/0138* (2013.01); *G02B 2027/0187* (2013.01)

(58) Field of Classification Search
CPC ...................... G02B 27/017; G02B 2027/0178; G02B 2027/0138; G02B 27/01; G02B 2027/0125; G02B 2027/0127; G02B 2027/0136; G02B 23/125; G02B 2027/014; G02B 2027/0187
See application file for complete search history.

(56) References Cited

U.S. PATENT DOCUMENTS

| | | | |
|---|---|---|---|
| 7,936,285 B2 | 5/2011 | Kneller et al. | |
| 7,949,157 B2 * | 5/2011 | Afzulpurkar et al. | 382/115 |
| 8,184,983 B1 * | 5/2012 | Ho et al. | 398/130 |
| 2008/0015983 A1 * | 1/2008 | Spikes | 705/40 |
| 2009/0319902 A1 | 12/2009 | Kneller et al. | |
| 2011/0158478 A1 * | 6/2011 | Yamada et al. | 382/103 |
| 2013/0044130 A1 * | 2/2013 | Geisner et al. | 345/633 |
| 2013/0127980 A1 * | 5/2013 | Haddick et al. | 348/14.08 |
| 2013/0268304 A1 * | 10/2013 | Doshi | 705/5 |

FOREIGN PATENT DOCUMENTS

| | | | | |
|---|---|---|---|---|
| DE | EP 1439498 A1 * | 7/2004 | .............. | G07C 9/00 |
| EP | 1 439 498 A1 | 7/2004 | | |

\* cited by examiner

*Primary Examiner* — Maurice L McDowell, Jr.
*Assistant Examiner* — Donna J Ricks
(74) *Attorney, Agent, or Firm* — Birch, Stewart, Kolasch & Birch, LLP

(57) ABSTRACT

A head mounted display (HMD) and a method for controlling the same are disclosed. Most particularly, the HMD and the method for controlling the same may detect an external device having a ticket stored therein and display augmented reality information related to the stored ticket in a location approximate to an individual carrying an external device, in order to check tickets.

19 Claims, 17 Drawing Sheets

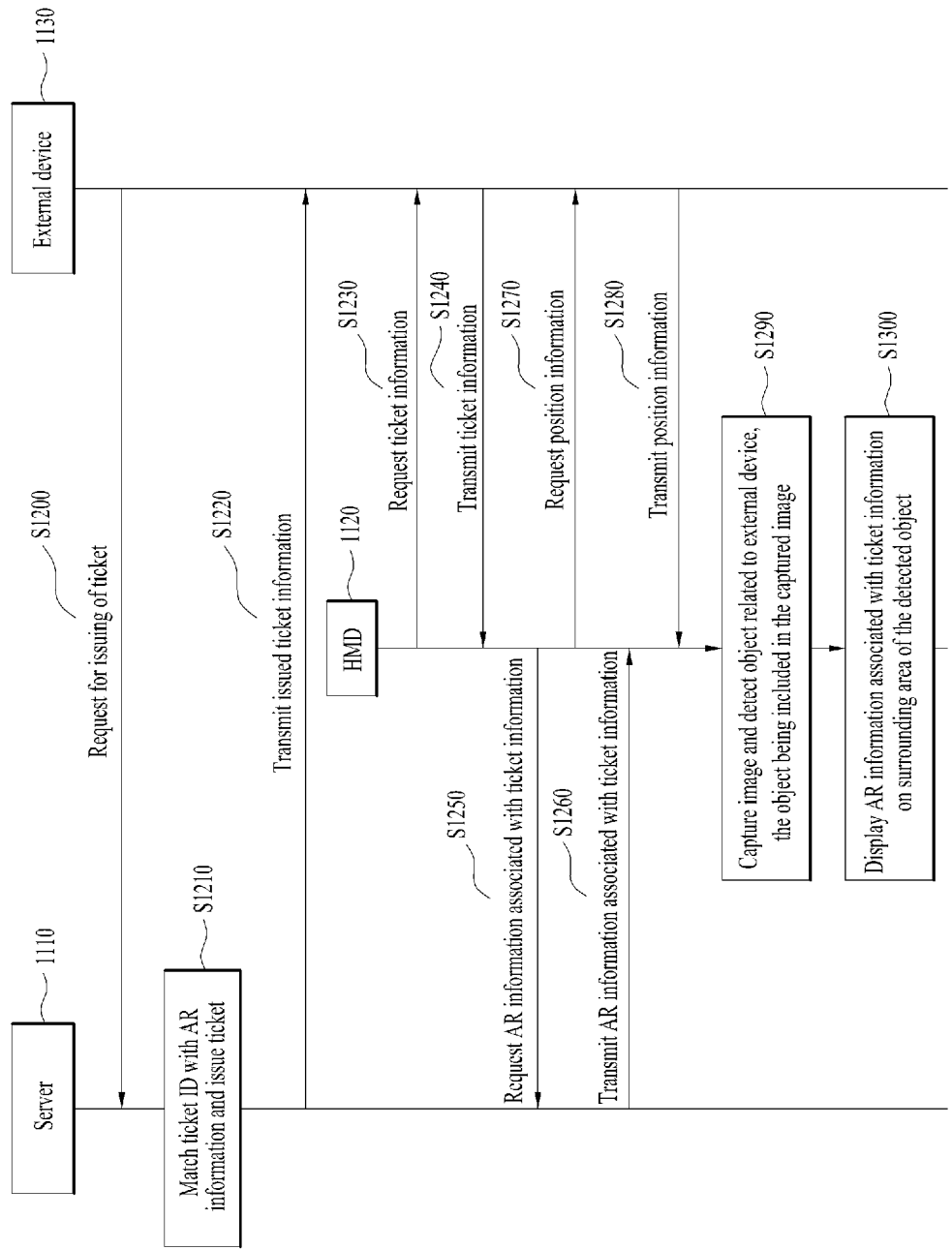

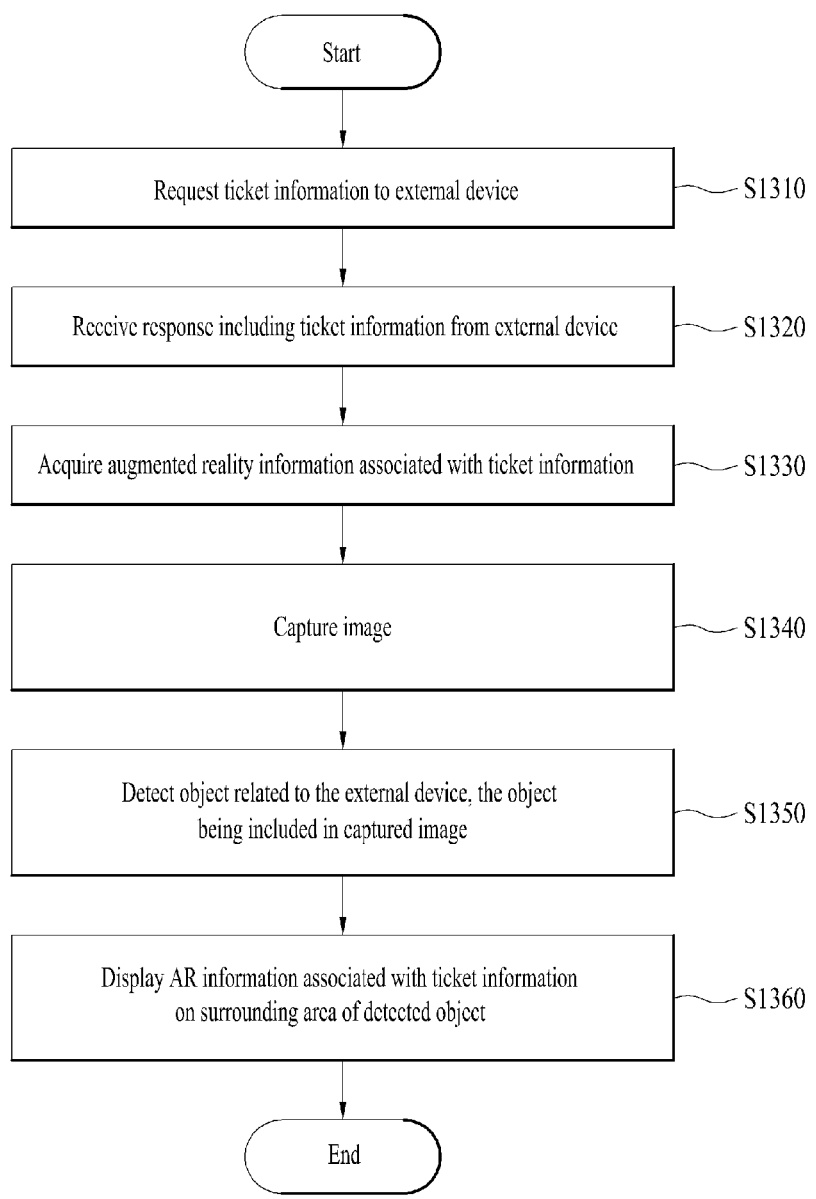

HEAD MOUNTED DISPLAY AND METHOD FOR CONTROLLING THE SAME

This application claims the benefit of the Korean Patent Application No. 10-2013-0001107, filed on Jan. 4, 2013, which is hereby incorporated by reference as if fully set forth herein.

BACKGROUND OF THE INVENTION

1. Field of the Invention

The present disclosure relates to system related to a head mounted display (HMD) and a method for controlling the same and, more particularly, to a HMD and a method for controlling the same that can detect an external device having a ticket stored therein and display augmented reality information related to the stored ticket in a location approximate to an individual carrying an external device, in order to check tickets.

2. Discussion of the Related Art

As the digital devices are becoming more light-weight and more compact in size, the application and usage range of portable devices is increasing. Accordingly, a user may use his (or her) portable device in order to be capable of more easily performing a wanted operation whenever and wherever he (or she) wishes. For example, the user may use a ticketing service by using his (or her) portable device without any limitations in time and space. Additionally, since the purchased tickets may be issued through an application installed in the user's portable device, the user is not required to carry the actual ticket(s).

However, when a user seeks to enter a concert hall or a movie theater by using his (or her) issued ticket, the user is required to show his (or her) ticket to a ticket checking agent (or ticket agent). Accordingly, the user is required to undergo the inconvenience of having to take out his (or her) portable device from his (or her) pocket or bag and to personally show the purchased digital ticket to the ticket agent.

SUMMARY OF THE INVENTION

Accordingly, the present disclosure is directed to a HMD and a method for controlling the same that substantially obviate one or more problems due to limitations and disadvantages of the related art.

An object of the present disclosure is to provide a ticket checking system that can allow the ticket agent to check a ticket without requiring showing the purchased ticket to the user.

Another object of the present disclosure is to provide a HMD and a method for controlling the same that can detect an external device having a ticket stored therein and display augmented reality information related to the stored ticket in a location approximate to a person carrying an external device.

Yet another object of the present disclosure is to provide augmented reality information generated based upon identification information related to tickets and not based upon location or image.

A further object of the present disclosure is to provide a HMD and a method for controlling the same that can accurately recognize a person carrying a portable device storing ticket, when the person is in positions approximate to the HMD.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a HMD includes a camera unit configured to capture an image of a surrounding area of the HMD, a display unit configured to display augmented reality information associated with the captured image, a communication unit configured to transmit and receive data to and from an external device, a sensor unit configured to sense a position of the HMD and to deliver the sensed result to a processor, and the processor configured to control the camera unit, the display unit, the communication unit, and the sensor unit. Herein, the processor may request ticket information to the external device, may receive a response including the ticket information according to the request from the external device, may acquires the augmented reality information associated with the ticket information, may detect an object related to the external device in the captured image, and may display the augmented reality information associated with the ticket information on a surrounding area of the detected object.

In another aspect of the present disclosure, a method for controlling a HMD includes the steps of requesting ticket information to an external device, receiving a response including the ticket information according to the request from the external device, acquiring augmented reality information associated with the ticket information, capturing an image of a surrounding area of the HMD, detecting an object related to the external device in the captured image, and displaying the augmented reality information associated with the ticket information on a surrounding area of the detected object.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the invention. In the drawings:

FIG. 12 illustrates a flow of data being processed by the elements configuring the ticketing system according to the exemplary embodiment of the present disclosure; and FIG. 13 illustrates a flow chart showing the process steps of a method for controlling the HMD according to the exemplary embodiment of the present disclosure.

DETAILED DESCRIPTION OF THE INVENTION

Although the terms used in the present disclosure are selected from generally known and used terms, the terms used herein may be varied or modified in accordance with the intentions or practice of anyone skilled in the art, or along with the advent of a new technology. Alternatively, in some particular cases, some of the terms mentioned in the description of the present disclosure may be selected by the applicant at his or her discretion, the detailed meanings of which are described in relevant parts of the description herein. Furthermore, it is required that the present disclosure is understood not simply by the actual terms used but by the meaning of each term lying within.

Additionally, reference will now be made in detail to the preferred embodiments of the present disclosure, examples of which are illustrated in the accompanying drawings. However, the description of the present disclosure will not be limited only to the exemplary embodiments presented herein.

Figure 1:
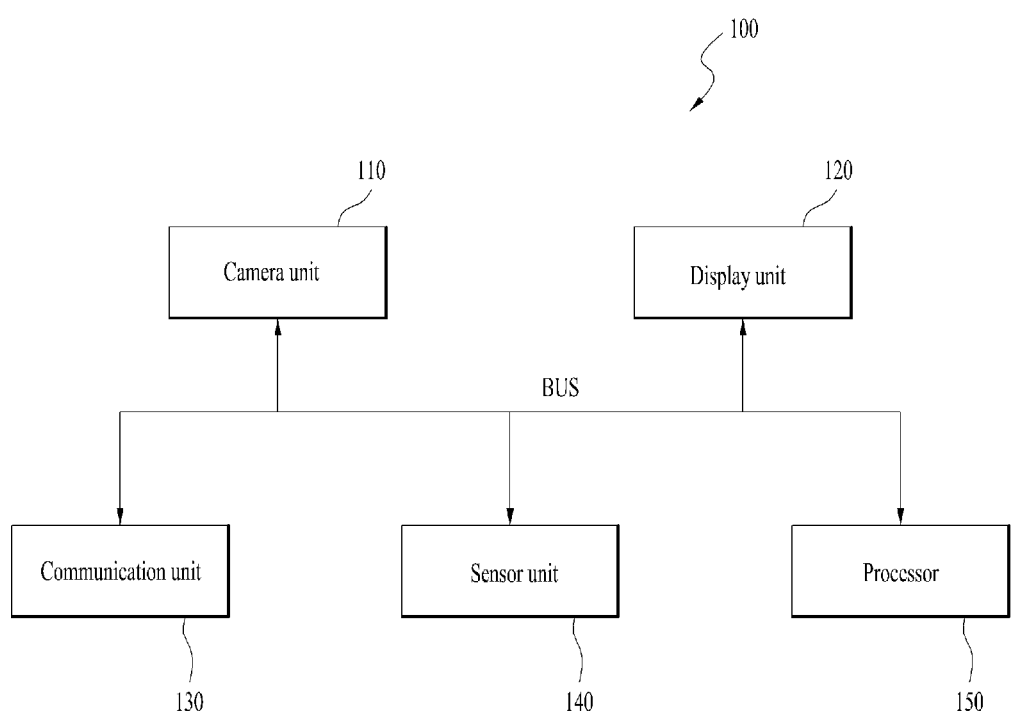
FIG. 1 illustrates a block view showing a head mounted display (HMD) according to an exemplary embodiment of the present disclosure.

FIG. 1 illustrates a block view showing a head mounted display (HMD) according to an exemplary embodiment of the present disclosure. However, FIG. 1 is merely exemplary. And, therefore, it will be apparent that some of the configuration module may be deleted or new configuration modules may be added to the HMD in accordance with the requirements of anyone skilled in the art.

As shown in FIG. 1, a head mount display (HMD) 100 according to the embodiment of the present disclosure may include a camera unit 110, a display unit 120, a communication unit 130, a sensor unit 140, and a processor 150.

First of all, the camera unit 110 may capture an image of the surroundings of the HMD 100. For example, the camera unit 110 may capture an image within a predetermined zone (hereinafter referred to as an 'angle of view zone') corresponding to an eyesight of a user wearing the HMD 100. Thereafter, the camera unit 110 may provide the captured image to the processor 150.

Additionally, the camera unit 110 may include a stereoscopic camera. For example, the camera unit 110 may include at least two lenses configured to be spaced apart from one another at a predetermined distance and to simultaneously film a same object. Herein, focus adjustment, exposure adjustment, and shutter operations of the at least two lenses may be interconnected to one another. Accordingly, in the HMD 100, the image being captured by the camera unit 110 may include a stereoscopic image (e.g., three-dimensional (3D) image).

At this point, the processor 150 may generate or store depth information of at least one object included in the captured image as additional information of the corresponding image. Moreover, the processor 150 may detect an external device including ticket information based upon the image acquired through the camera unit 110. At this point, the processor 150 may use the depth information. However, this will be described in more detail later on.

Furthermore, the camera unit 110 may be included in the HMD 100 as a unit separate from the sensor unit 140, which will be described in detail later on. However, the camera unit 110 may also be integrated with the sensor unit 140, thereby being included in the HMD 100.

The display unit 120 may output an image on a display screen. At this point, the display unit 120 may output an image based upon a content being executed by the processor 150 or based upon a control command of the processor 150.

Additionally, when the camera unit 110 includes a stereoscopic camera, the display unit 120 may include a structure displaying stereoscopic images, so that the user wearing the HMD 100 can view the corresponding stereoscopic images.

Moreover, the display unit 120 may display augmented reality information related to the image acquired from the camera unit 110. The augmented reality information may be received from an external server and may be pre-stored in the HMD 100. The augmented reality information will be described in more detail later on with reference to FIG. 7.

The communication unit 130 may communicate with an external device by using diverse protocols, so as to transmit and receive data to and from the external device. Additionally, the communication unit 130 may access a network via wired or wireless communication, thereby being capable of transmitting and receiving digital data, such as ticket information, augmented reality information, and so on.

Accordingly, the communication unit 130 may transmit and receive data related to the ticket information to and from an external device, which corresponds to a portable device, or a server issuing the corresponding tickets.

Meanwhile, the sensor unit 140 may use at least one sensor equipped in the HMD 100, so as to sense the surrounding environment of the HMD 100 and to deliver the sensed information to the processor 150 in the form of a signal. Also, the sensor unit 140 may sense a user input and may deliver an input signal according to the sensed result to the processor 150.

Accordingly, the sensor unit 140 may include at least one sensing means. According to an embodiment of the present disclosure, the at least one sensing means may include at least one of a gravity sensor, a geomagnetic (or terrestrial magnetism) sensor, a motion sensor, a gyroscope sensor, an acceleration sensor, an infrared sensor, an inclination sensor, a brightness sensor, an altitude sensor, an odor sensor, a temperature sensor (or thermal sensor), a depth sensor, a pressure sensor, a banding sensor, an audio sensor, a video sensor, a Global Positioning System (GPS) sensor, a touch sensor, and so on.

Moreover, when the sensor unit 140 senses a location or direction of the HMD 100, the processor 150 may detect position information or direction information of the HMD 100. This will be described in more detail with reference to FIG. 3.

Furthermore, the sensor unit 140 collectively refers to the diverse sensing means mentioned above. Herein, after sensing various inputs of the user and by sensing the environment of the HMD 100, the sensing unit 140 may deliver may deliver the sensed result, so that the processor 150 can perform the respective operations.

The above-described sensors may be included in the HMD 100 as separate elements, to the above-described sensors may be integrated to at least one element, thereby being included in the HMD 100.

Meanwhile, the processor 150 may process the data within the processor 150. And, by controlling each unit of the above-described HMD 100, the processor 150 may control data transmission and reception between the units.

Furthermore, various signals including data or control signals between units may be transmitted and received through a bus.

Additionally, although it is not shown in FIG. 1, the HMD 100 may be equipped with a storage unit, an audio input/output unit, or a power unit.

The storage unit (not shown) may store diverse digital data, such as audio data, still images, moving picture images, applications, and so on. Herein, the storage unit represents diverse types of digital data storage space, such as flash memory, Random Access Memory (RAM), Solid State Drive (SSD), and so on.

Moreover, the storage unit may temporarily store data received from an external device through the communication unit 130. At this point, the storage unit may be used to perform buffering in order to enable the HMD 100 to output the data received from the external device. Herein, the storage unit may be optionally equipped in the HMD 100.

The audio output unit (not shown) may include audio output means, such as speakers, earphones, and so on. Additionally, the audio output unit may output audio (or sound) based upon a content being executed by the processor 150 or based upon a control command of the processor 150. At this point, the audio output unit may be optionally equipped in the HMD 100.

The power unit corresponds to a power source being connected to an internal (or embedded) battery or an external power unit. Herein, the power unit may provide power to the HMD 100.

Additionally, as FIG. 1 corresponds to a block view of the HMD 100 according to the embodiment of the present disclosure, the separate blocks shown in FIG. 1 respectively represent elements of the device being logically differentiated from one another. Accordingly, the elements of the above-described device may be collectively mounted (or equipped) as a single chip or may be separately mounted (or equipped) as a plurality of chips, depending upon the design of the device.

Figure 2:
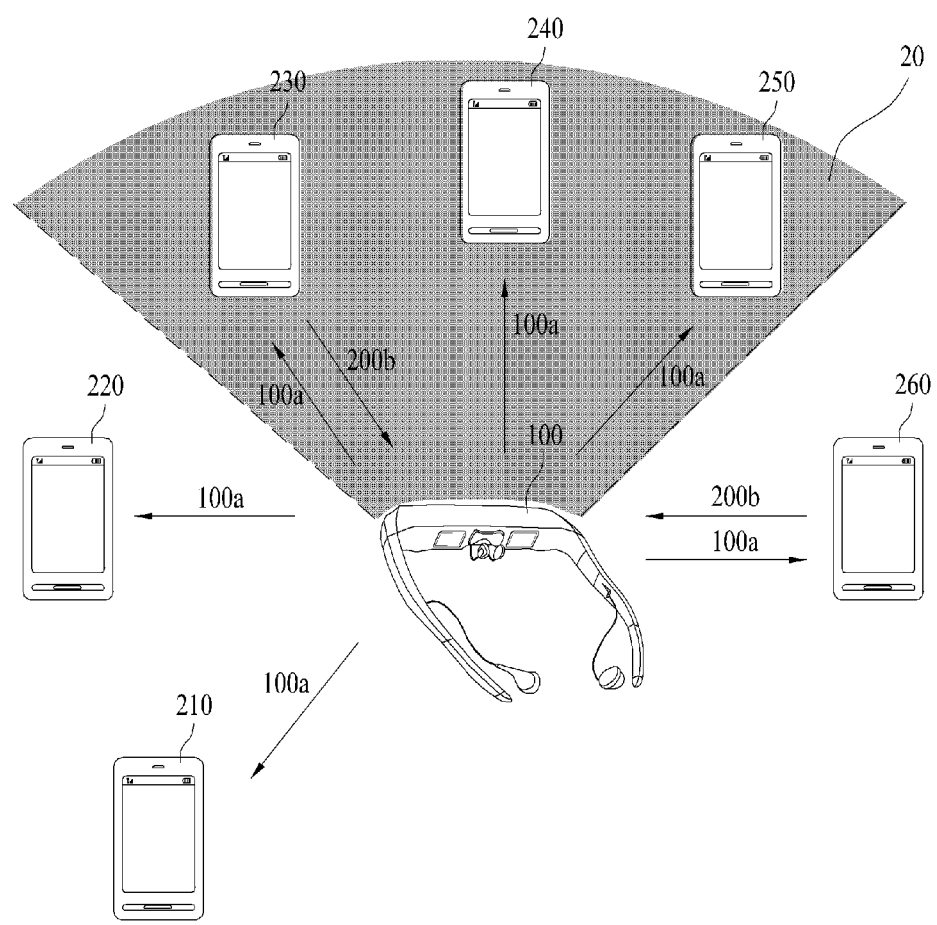
FIG. 2 illustrates an example of data being transmitted and received to and from the HMD and an external device according to the exemplary embodiment of the present disclosure.

FIG. 2 illustrates an example of data being transmitting and receiving to and from the HMD and an external device according to the exemplary embodiment of the present disclosure.

The HMD 100 may request ticket information to an external device, so as to allow a user wearing the HMD 100 to check (or verify) ticket information being stored in the external device. At this point, however, since it is difficult to recognize the external device having the requested ticket information stored therein, the HMD 100 may request the ticket information by using a broadcast way.

Accordingly, when the HMD 100 requests the ticket information, the MID 100 may transmit the ticket information that is to be checked (or verified) at the same time. For example, when a ticket agent seeks to verify and check tickets in a theater, a movie theater, or a concert hall, the ticket information that is to be verified may include at least one of information on the theater or concert hall of the ticket that is to be checked, information on the time of the movie or show, information on the name of the movie or show, and information on the actors starring in the movie or the performers or actors performing in the show.

Additionally, when a ticket agent seeks to verify and check boarding tickets for boarding on an airplane, a bus, a train, and so on, the ticket information may include at least one of freight information of the airplane, bus, or train (e.g., flight number of the airplane, bus number, train number, and so on), time of departure, time of arrival, and information on the point of departure and destination.

At this point, the external device storing the ticket related to the requested ticket information may send a response in accordance with the request sent from the HMD 100. Additionally, the response may include ticket information including at least one of seat information, boarding information, and payment information.

In other words, the broadcast way corresponds to a way of having one transmitter transmit data to all receivers within the same sub network. Therefore, being the transmitter, the HMD 100 may request ticket information to all external devices within the same sub network. Accordingly, as shown in FIG. 2, the HMD 100 may send a request ticket information to external devices 210, 220, 230, 240, 250, and 260 all existing in the same sub network by using the broadcast way.

Among the external devices 210, 220, 230, 240, 250, and 260 receiving the transmitted request for ticket information 100a, the external devices 230 and 260 actually storing the requested ticket information may send a response 200b including the requested ticket information to the HMD 100. The external devices 210, 220, 230, 240, 250, and 260 according to the exemplary embodiment of the present disclosure may each include a portable device that can be carried and used by a user while being in a mobile state.

When the ticket, which the ticket agent wearing the HMD 100 seeks to verify and check, is differentiated only by seat information, such as seat information in a movie theater or concert hall, on a train or an airplane, without requiring any personal information on the individual who has booked the corresponding seat, the corresponding ticket is particularly more advantageous and useful. In this case, since the ticket agent wearing the HMD 100 is only required to verify the seat information or payment information indicated on the corresponding ticket, the ticket checking procedure may be performed and completed within a short period of time.

Meanwhile, by having the HMD 100 according to the exemplary embodiment of the present disclosure display augmented reality information according to the ticket information received from the external device, which has transmitted a response to the HMD 100 including the requested ticket information, the ticket agent wearing the HMD 100 may be capable of checking tickets more easily and more conveniently. Respectively, since the user carrying an external device is not required to take out his (or her) external device in order to show the ticket stored therein to the ticket agent wearing the HMD 100, the user may also enter the movie theater, the concert hall, or the boarding gate of an airplane, a train, and so on, more conveniently.

In order to do so, the HMD 100 according to the embodiment of the present disclosure may capture an image corresponding to the view of the ticket agent wearing the HMD 100. Thereafter, the HMD 100 may detect an object related to the external device from the captured image. Then, the HMD 100 may display the respective augmented reality information according to the ticket information.

Accordingly, among the external devices 230 and 260 that have responded to the HMD 100, the HMD 100 is required to detect the external device 230, which exists within the angle of view zone 20, i.e., a zone corresponding to the eyesight of the user wearing the HMD 100 and from which an image may be captured by the camera unit.

Thus, the HMD 100 may acquire position information of the external devices 230 and 260 that have responded to the HMD 100. At this point, the HMD 100 may receive position information according to a Global Positioning System (GPS) from the corresponding external devices 230 and 260.

However, when the GPS signal does not reach the HMD 100, or when more accurate and detailed position information is required, the HMD 100 may use information on a wireless LAN signal of the corresponding external devices 230 and 260 and information on an address in which the HMD exists, so as to acquire position information of the corresponding external devices 230 and 260.

In case of using a GPS signal, it is disadvantageous in that, when the indoor radius is equal to or wider than 500 m or 700 m, it is difficult to determine the accurate location of the external devices. Therefore, when the ticket agent checks the tickets indoors, the position information of each external device may be known by using the wireless LAN signal information, which is collected indoors, and by using address information of the place where the ticket agent seeks to perform the ticket checking procedure. In other words, the HMD 100 may be capable of finding a unique Access Address (AP) of the external device 230 and 260 even in a place where the GPS signal does not reach by using a wireless LAN signal relay, which is installed indoors.

As described above, when the HMD 100 uses the wireless LAN signal information and the address information corresponding to the place where the HMD 100 is located, since the HMD 100 shows an accuracy level within a difference range of 10 m, it will be more advantageous and useful to check the tickets indoors. Meanwhile, the HMD 110 may use the position information of the external devices 230 and 260, so as to detect whether or not the external device 230 and 260 exist within the angle of view zone 20. This will be described in more detail with reference to FIG. 3.

Figure 3:
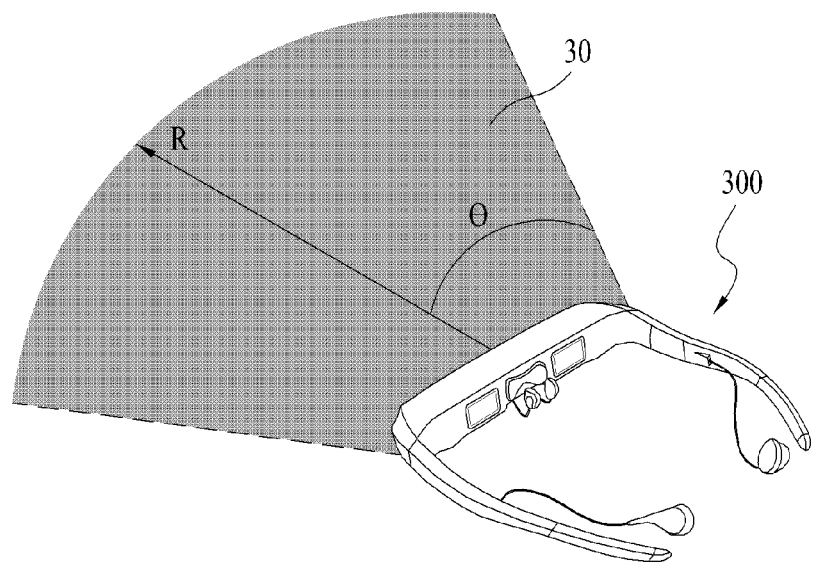
FIG. 3 illustrates an example of having the HMD detect a location of the external device according to the exemplary embodiment of the present disclosure.

FIG. 3 illustrates an example of having the HMD detect a location of the external device according to the exemplary embodiment of the present disclosure.

The HMD 300 according to the present disclosure may detect an object related to the external device, which has responded to the HMD 300, from the captured image, and, then, the HMD 300 may display augmented reality information associated with the ticket information on the surrounds of the detected object. In order to do so, the HMD 300 may capture an image to direction R of the HMD 300, so that the ticket agent wearing the HMD 30 can check tickets after referring to the augmented reality information associated with the ticket information.

Accordingly, direction R of the HMD 300 corresponds to a direction along which the HMD 300 views and captures an image. For example, the direction of the HMD 300 may correspond to a viewing direction of the ticket agent wearing the HMD 300 and facing forward (i.e., a forward direction). Respectively, the HMD 300 may generate direction information $\theta$ of the corresponding external device based upon the position information of the external device. The direction information $\theta$ of the corresponding external device refers to information indicating how far the external device is located from the direction R of the HMD 30. Herein, the direction information $\theta$ of the corresponding external device is used to determine whether or not the external device is located within the angle of view zone 30 of the HMD 300.

The HMD 300 may sense the position information of the HMD 300. Therefore, the HMD 300 may use the position information of the HMD 300, the direction R information of the HMD 300, and the position information of the external device, so as to determine the direction information $\theta$ of the external device indicating how far the external device is located from the HMD 300 along the direction R of the HMD 300 (i.e., the distance between the external device and the HMD 300 along direction R).

More specifically, the HMD 300 may use the direction information $\theta$ of the external device, so as to identify the external device 230 existing within the angle of view zone 30 from the external devices 230 and 260 responding to the HMD 300 (i.e., the external devices 230 and 260).

Additionally, when the HMD 300 detects the presence of the external device 230 within the angle of view zone 30 of the HMD 300, the HMD 300 may capture an image to the direction of the HMD 300. Accordingly, the HMD 300 may detect an object related to the external device 230 from the captured image, thereby being capable of displaying augmented reality information associated with the ticket information.

As described above, in order to detect whether or not the external devices 230 and 260 are located within the angle of view zone 30 of the HMD 300, or in order to detect an object related to the external device from the captured image to the direction R of the HMD 300, the HMD 300 may extract the position information of the external device located within the angle of view zone 30 of HMD 300, wherein the extract position information corresponds to relative position information between the external device and the HMD 300. This will be described in more detail with reference to FIG. 4.

Figure 4:
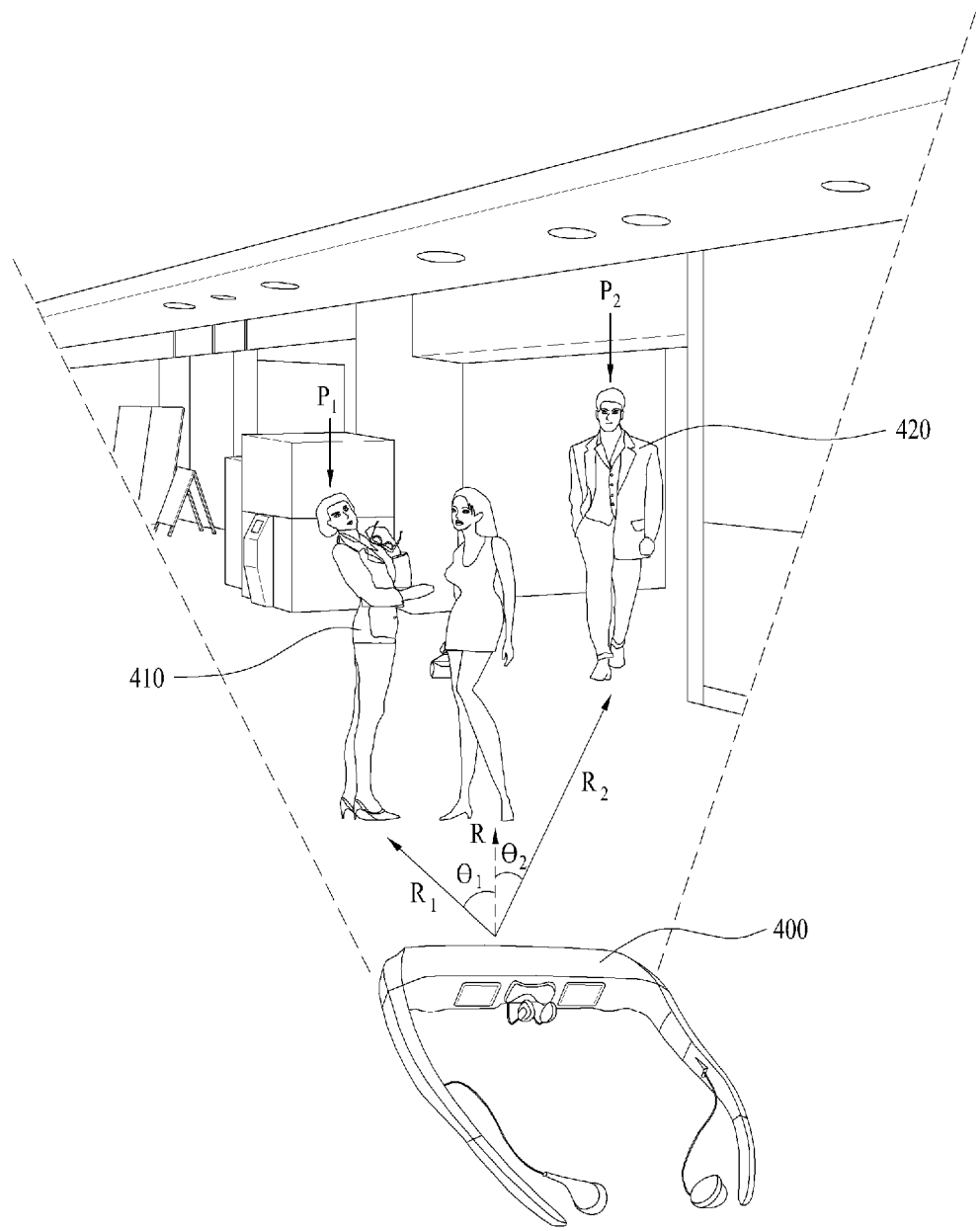
FIG. 4 illustrates an example of having the HMD detect an object related to an external device from a captured image according to the exemplary embodiment of the present disclosure.

FIG. 4 illustrates an example of having the HMD detect an object related to an external device from a captured image according to the exemplary embodiment of the present disclosure.

First of all, it will be assumed that the HMD 400 acquires position information $P_1$ and $P_2$ of a first external device and a second external device, which are located within the angle of view zone. Based upon the acquired position information $P_1$ and $P_2$ of the first external device and the second external device, the HMD 400 may extract at least one of distance information, direction information, and altitude information of an external device with respect to the position (or location) of the HMD 400.

In other words, the HMD 400 may use GPS information, gravity information using a sensor, such as a gyroscope sensor, and so on, so as to determine the direction of the HMD 400 and the current position information of the HMD 400. Alternatively, the HMD 400 may use the wireless LAN signal information of the HMD 400 and the address information of the position (or location) where the ticket checking event is to take place, so as to be informed of the position information of the HMD 400. Accordingly, the HMD 400 may use the position information of the HMD 400 and the acquired absolute position information $P_1$ and $P_2$ of the external devices, thereby being capable extracting the relative position information of the first external device and the second external device, with respect to the HMD 400.

For example, the HMD 400 may extract distance information $R_1$ between the HMD 400 and the first external device and direction information $\theta_1$ being spaced apart from the HMD 400 along direction R of the HMD 400. Additionally, the HMD 400 may extract distance information $R_2$ between the HMD 400 and the second external device and direction information $\theta_2$ being space apart from the HMD 400 along direction R of the HMD 400. Moreover, although it is not shown in FIG. 4, the HMD 400 may also extract altitude information according to a difference in altitude between the HMD 400, the first external device, and the second external device.

Furthermore, the HMD 400 may detect a subject corresponding to the extracted relative position information of the external device, and the HMD 400 may also detect an object with a captured image corresponding to the detected subject. For example, the detected object may correspond to an external device, a person, a handbag or purse, and so on within the captured image.

In other words, the HMD 400 may detect a subject corresponding to the relative position information of the external device. And, then, the HMD 400 may detect an object within a captured image corresponding to the detected subject. Thus, the HMD 400 may be capable of determining the object related to the external device. Accordingly, the HMD 400 may extract the position information of the subject and may match the subject with the object of the captured image. This will be described in more detail later on.

First of all, when the HMD 400 determines the distance by using infrared light rays, ultrasound waves, and so on, since the direction of the infrared light rays, ultrasound waves, and so on corresponds to the direction of a specific subject, the HMD 400 may also be capable of determining the direction of the specific subject. Additionally, when required, the HMD 400 may set up a reference direction, and, then, the HMD 400 may use direction shift information (or direction change information) of the END 400, so as to acquire the direction of the specific subject.

Subsequently, the HMD 400 may acquire the captured image as a stereoscopic image. At this point, the HMD 400 may extract depth information of at least one object included in the stereoscopic image. Moreover, the HMD 400 may also use the acquired depth information, so as to determine a relative distance between objects included in the stereoscopic image.

Accordingly, the HMD 400 may use the distance between the HMD 400 and the specific subject, which is acquired by using infrared light rays, ultrasound waves, and so on, and the relative distance (e.g., depth information) between the objects included in the stereoscopic image, so as to acquire the distance between the HMD 400 and all of the subjects captured in images.

For example, the HMD 400 may set up the distance between the HMD 400 and a first object as a basic distance. Diverse methods other than the above-described method of using infrared light rays, ultrasound waves, and so on, may be used by the END 400 as the method for acquiring the basic distance. The HMD 400 may use a difference between depth information of the first object 410 corresponding to the first subject and depth information of the second object 420 corresponding to a second subject and the basic distance, so as to acquire the distance between the HMD 400 and the second subject.

As described above, the HMD 400 may be capable of determining the relative position information of the subject with reference to the position of the HMD 400. Accordingly, by comparing the position information of the subject and the position information of the external device, the HMD 400 may detect the subject corresponding to the relative position information of the external device. Thereafter, the HMD 400 may detect the object corresponding to the detected subject as the object related to the external device. At this point, when the position information of the subject is included in a predetermined range, with respect to the position information of the external device, the HMD 400 may determine that the position information of the subject is identical to the position information of the external device.

As shown in FIG. 4, the first subject refers to the subject corresponding to the relative position information of the first external device, and the second subject refers to the subject corresponding to the relative position information of the second external device. Therefore, the HMD 400 may use the relative position information of the external device, the distance between the HMD 400 and the subject, and the depth information of the object, so as to detect the object 410 related to the first external object and the object 420 related to the second external object.

In short, the HMD 400 may set up the distance between the HMD 400 and a specific subject as the basic distance, and then, the HMD 400 may acquire the distance between the HMD 400 and the remaining subjects in accordance with the depth information of the object. Additionally, when the HMD 400 detects a subject corresponding to the relative position information of the external device, the HMD 400 may decide the object corresponding to the subject as the object related to the external device.

More specifically, the HMD 400 may use at least one of the relative position information, i.e., distance information, direction information, and altitude information, of the external device and the depth information of at least one of the objects included in a captured image, so as to match the object related to the external device.

Moreover, in addition to the above-described method, the HMD may use diverse methods for matching the position of the external device with the object included in a captured image.

Herein, a captured image may include diverse subjects, such as a building, a person, an object, and so on. However, in order to efficiently extract an object related to the external device, the HMD may concentrate on extracting objects related to people, so as to perform matching of the extracted objects as objects related to the external device. Accordingly, in order to concentrate on extracting objects related to people, the HMD may store in advance samples of object images related to people. Furthermore, by using the method of processing images using the pre-stored samples, the HMD may be capable of extracting objects related to people from a captured image.

Hereinafter, a method used by the HMD for recognizing an object from a captured image according to the exemplary embodiment of the present disclosure will be described in detail.

Figure 5:
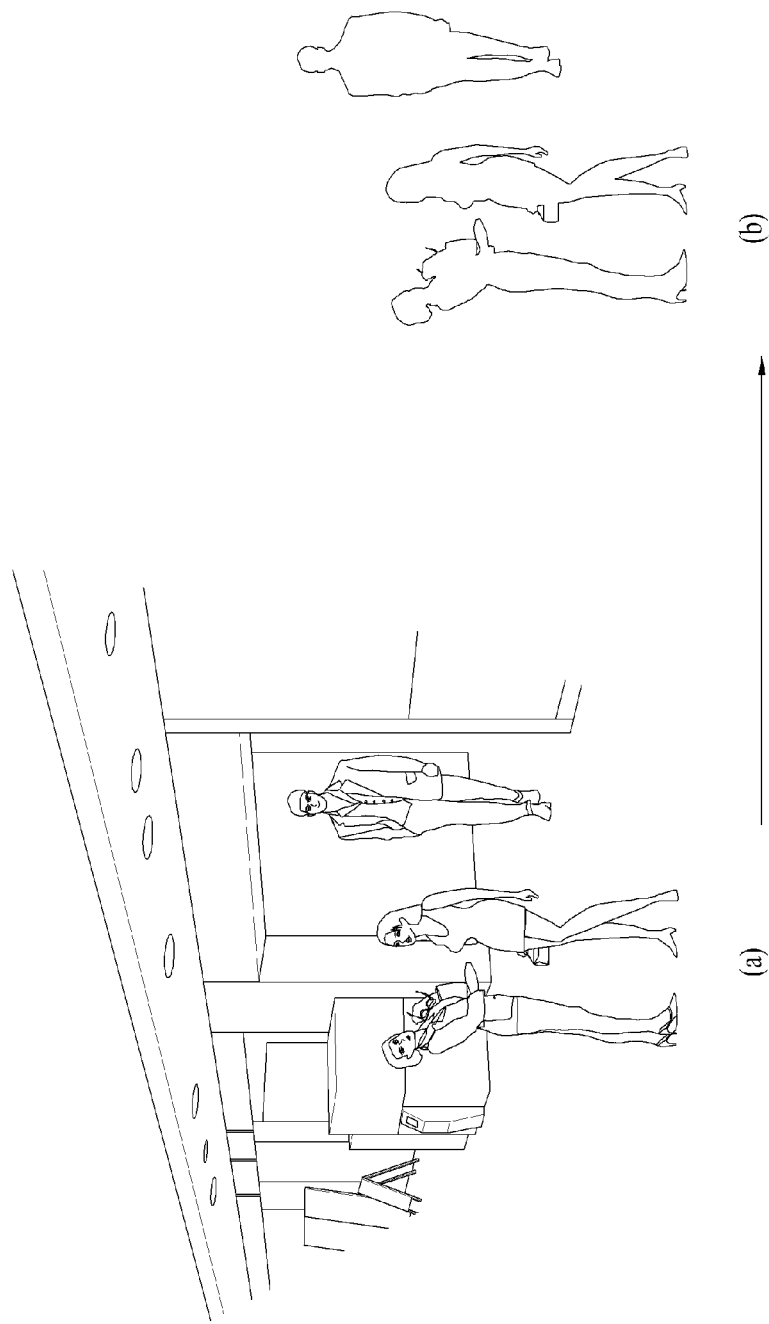
FIG. 5 illustrates an example of having the HMD recognize an object from a captured image according to the exemplary embodiment of the present disclosure.

First of all, FIG. 5 illustrates an example of having the HMD recognize an object from a captured image according to the exemplary embodiment of the present disclosure.

According to the exemplary embodiment of the present disclosure, the HMD may capture an image, as shown in (a) of FIG. 5, and the HMD may extract borderlines of the captured image, as shown in (b) of FIG. 5. Thereafter, the HMD may recognize an object based on a looped curve (or closed curve) from the extracted borderline.

Additionally, the HMD may convert the format of the captured image to a gray mode. Then, the HMD may use diverse algorithms, such as a Sobel Mask, a Roberts Mask, and so on, on the converted image, so as to extract the borderline, as shown in (b) of FIG. 5. Moreover, the HMD may recognize the object from the extracted borderline.

The HMD may also recognize an object from the captured image by using other methods. For example, the HMD may use a morphological basis, such as proximity, similarity, continuity, and so on, so as to group the objects included in the captured image. More specifically, by using a perceptual method and a downward feedback within a viewing layer of an image, the HMD may embody diverse heterogeneous visual forms as a single visual form.

As described above, grouping the objects may be advantageous in that, when the HMD detects a person holding a handbag, although the person and the handbag are separate objects, since the person and the handbag are correlated to one another, the two objects may be collectively recognized as a single object. Accordingly, the HMD may easily set up a position where the augmented reality information is to be displayed.

However, when a person carrying an external device having a ticket stored therein enters a concert hall, movie theater, boarding gate, and so on, while holding hands with or holding the arm of another person, it may be difficult for the HMD to accurately display the augmented reality information related to the ticket information on the surroundings of the person, who is actually carrying the external device. Additionally, when the external device having the ticket stored therein is placed in a handbag, it may be difficult for the HMD to accurately display the corresponding augmented reality information on the surroundings of the person carrying the external device.

Accordingly, the HMD according to the exemplary embodiment of the present disclosure may use the relative position information of the external device, e.g., at least one of the distance information, direction information, and altitude information between the HMD and the external device, so as to generate an identification area corresponding to the position of the external device within the captured image. Additionally, the HMD may use the extracted borderline, so as to include the generated identification area, or so as to detect an object adjacent to the identification area, thereby being capable of deciding the object corresponding to the augmented reality information that is to be displayed. Therefore, by displaying augmented reality information related to the ticket information on the surroundings of the person carrying the external device within a real background, the HMD may allow the ticket agent wearing the HMD to easily check tickets.

This will hereinafter be described in detail with reference to FIG. 6 and FIG. 7.

Figure 6A:
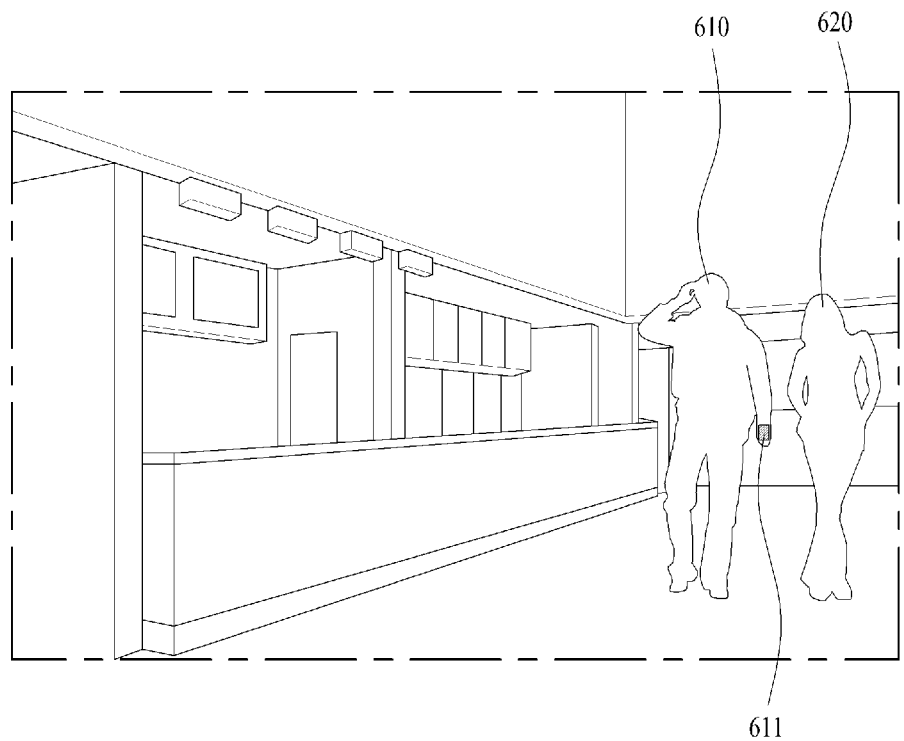
FIG. 6a to FIG. 6c respectively illustrate an example of having the HMD extract an object from the captured image and determine an identification area according to the exemplary embodiment of the present disclosure.
Figure 6B:
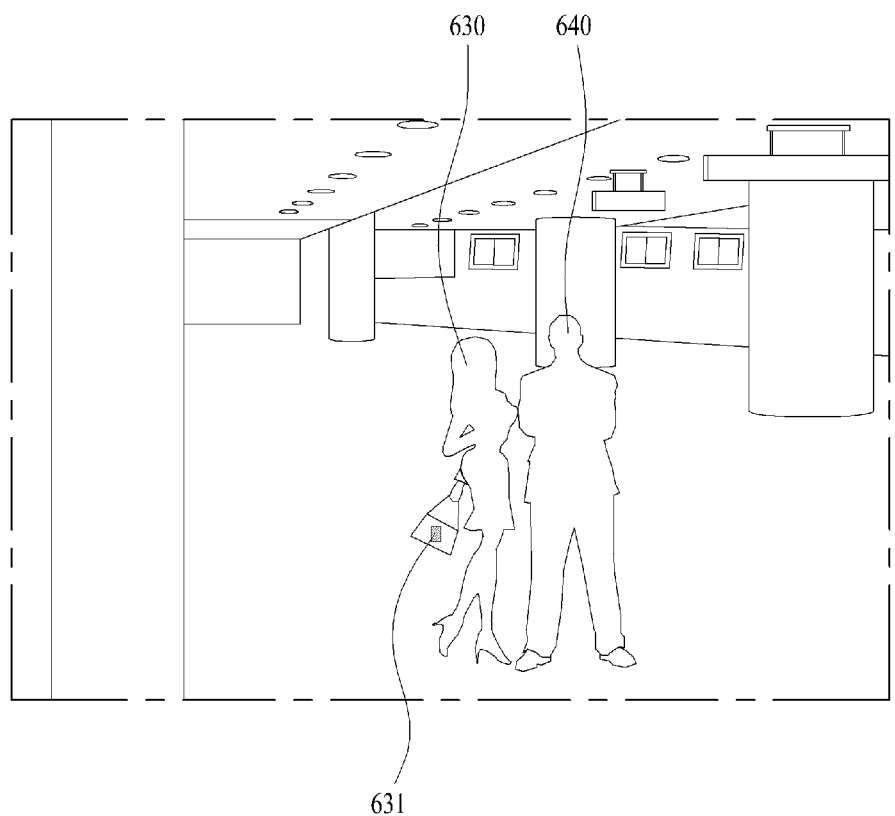
Figure 6C:
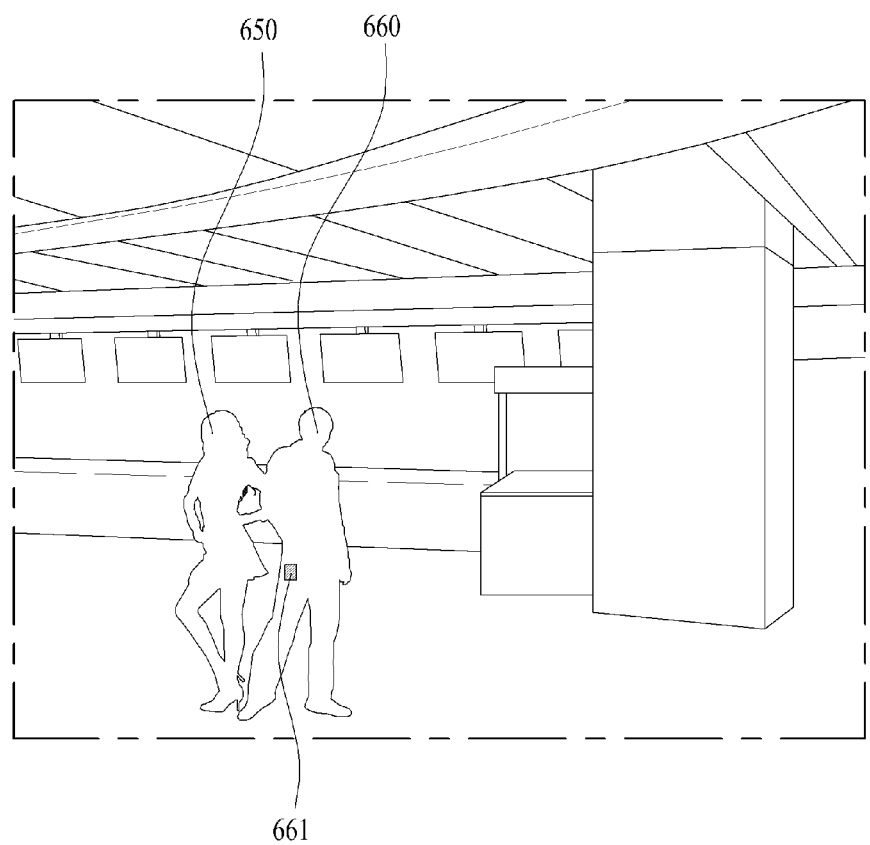

FIG. 6a to FIG. 6c respectively illustrate an example of having the HMD extract an object from the captured image and determine an identification area according to the exemplary embodiment of the present disclosure. And, FIG. 7a to FIG. 7c respectively illustrate an example of displaying augmented reality information in the surrounding area of an object related to the external device being decided in FIG. 6a to FIG. 6c based upon the identification area according to the exemplary embodiment of the present disclosure.

The HMD stores in advance (or pre-stores) the borderline of a person and, then, uses the borderline extracted from the captured image, so as to extract an object corresponding to a person. Accordingly, as shown in FIG. 6a, the HMD may extract the borderline from the captured image, so as to extract objects 610 and 620 corresponding to a person.

Additionally, the HMD may determine a distance between the HMD and the subject by using infrared light rays, or ultrasound waves. And, by using a left image and a right image for configuring the stereoscopic image or 3D image acquired from the camera unit, the HMD may be capable of extracting depth information of the object included in the corresponding image.

Therefore, the HMD may use the relative position information of the external device, so as to detect the position of the external device within the captured image, thereby determining (or setting up) the identification area 611.

At this point, in order to display augmented reality information related to the ticket on a more accurate position, as shown in FIG. 6a, the HMD may decide the object 610 including the identification area 611 as the object related to the external device.

As described above, the HMD may recognize an object based on a looped curve (or closed curve) from the extracted borderline. At this point, by using a sample of extracting a looped curve from diverse borderlines of a person, the HMD may be capable of recognizing the object related to a person from diverse objects with respect to the looped curve.

Figure 7A:
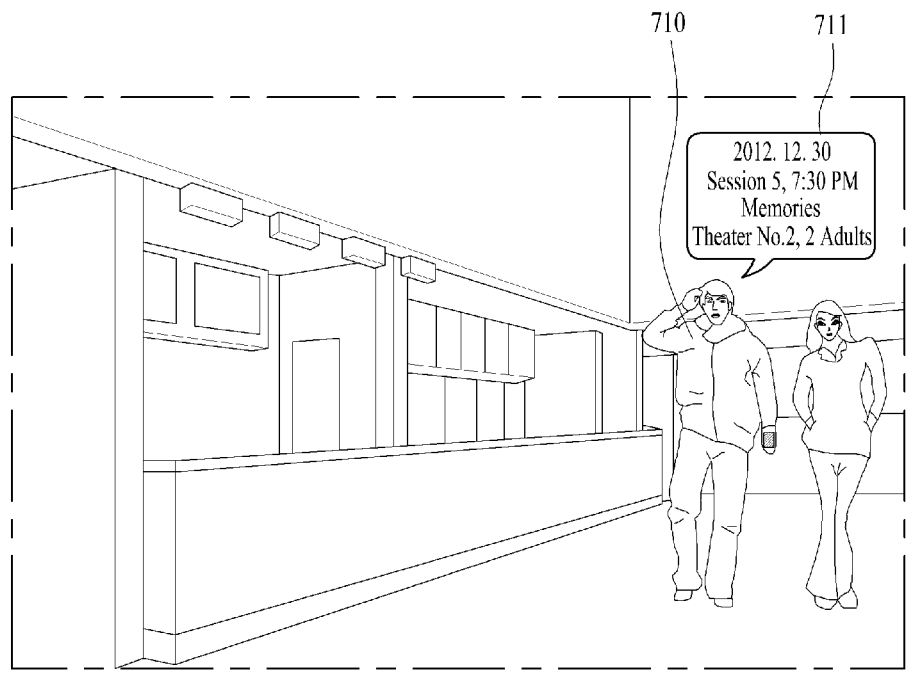
FIG. 7a to FIG. 7c respectively illustrate an example of displaying augmented reality information in the surrounding area of an object related to the external device being decided in FIG. 6a to FIG. 6c based upon the identification area according to the exemplary embodiment of the present disclosure.

Therefore, as shown in FIG. 7a, once the HMD decides the object related to the external device, the HMD may display the augmented reality information 711 associated with the ticket information on the area surrounding area the object 710 related to the external device. Accordingly, the ticket agent may check the ticket easily the minute the ticket agent sees the object. Because the ticket agent wearing the HMD can actually see the augmented reality information associated with the ticket information to the object along with the actual view of the ticket agent.

Most particularly, the HMD according the exemplary embodiment of the present disclosure may change (or relocate) the position of displaying the augmented reality information in accordance with the movement of the external device. Therefore, the HMD according to the exemplary embodiment of the present disclosure is advantageous in that, even when the external device moves (or is relocated), the HMD is capable of displaying the augmented reality information related to the ticket information on an accurate position.

FIG. 6a illustrates an exemplary case when a user is holding the external device in his hand. Conversely, FIG. 6b illustrates an exemplary case when a user is carrying the external device in her handbag (or purse). In this case, according to the embodiment shown in FIG. 6b, the MID detects the user carrying the external device as the object related to the external device.

As shown in FIG. 6b, the HMD may extract a borderline from a captured image and may, then, extract objects 630 and 640 corresponding to a person. Additionally, by using the relative position information of an external device, the HMD may detect the position of the external device within the captured image, so as to determine the identification area 631.

In order to do so, it is assumed that the HMD is aware of the distance between the HMD and an actual subject corresponding to the object, which is included in the captured image, and also aware of the depth information of the object within the captured image. Accordingly, the HMD may use the relative position information of the external device, so as to determine the identification area 631. At this point, when an object related to a person including the identification area 631 does not exist, an object 630 that is most approximate to the identification area 631 may be detected as the object related to the external device.

Figure 7B:
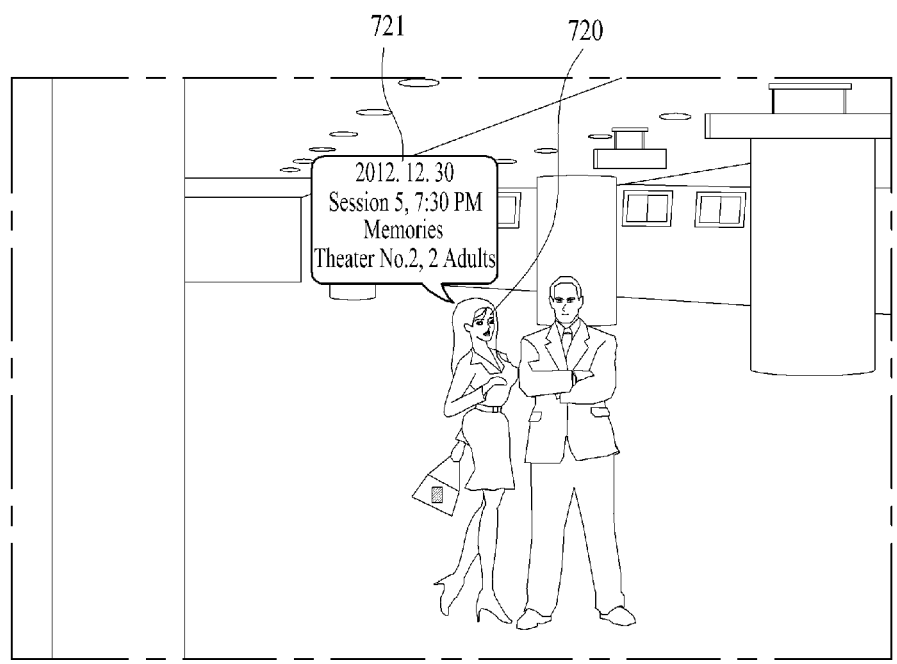

Therefore, once the HMD decides the object related to the external device, as shown in FIG. 7b, the HMD may display augmented reality information 721 associated with the ticket information on the surrounding area of the object 720 related to the external device.

As described above, even if the user carrying a ticket does not take out his (or her) external device, which has the corresponding ticket stored therein, in order to allow the ticket agent to check his (or her) ticket, the ticket agent wearing the HMD may be capable of verifying the corresponding ticket by using the respective augmented reality information. Therefore, it is advantageous in that the user can have his (or her) ticket verified and checked without having to take out the external device from his (or her) pocket and enter the concert hall, movie theater, or boarding gate without any inconvenience.

However, in some particular cases, such as when the user carrying the ticket is holding the arm or hand of another user, two or more users may move as a single body. In this case, it may be difficult to identify the user, who is actually carrying the ticket, among the group of users moving along the same direction. However, the HMD according to the exemplary embodiment of the present disclosure may accurately detect the specific user carrying the ticket and may, then, display the augmented reality information associated with the ticket information.

As shown in FIG. 6c, when a person carrying an external device moves about as a closely packed group with another person, the HMD according to the embodiment of the present disclosure may extract an borderline from the captured image and may, then, extract an object 650 and 660 corresponding to a person.

Additionally, by using the relative position information of the external device, the HMD may detect the position of the external device within the captured image, thereby determining the detected position as the identification area 661. Moreover, by using the wireless LAN signal of the external device, so as to acquire accurate position information, the HMD may be capable of more accurately determining which specific object among the plurality of neighboring objects includes the identification area 661 or is most closely to the identification area 661.

Most particularly, as shown in FIG. 6c, when an object 660 including the identification area 661 and an object 650 adjacent to the identification 661 both exist, the HMD may first decide the object 660 including the identification area 661 as the object related to the external device over the object 650 adjacent to the identification area 661.

Figure 7C:
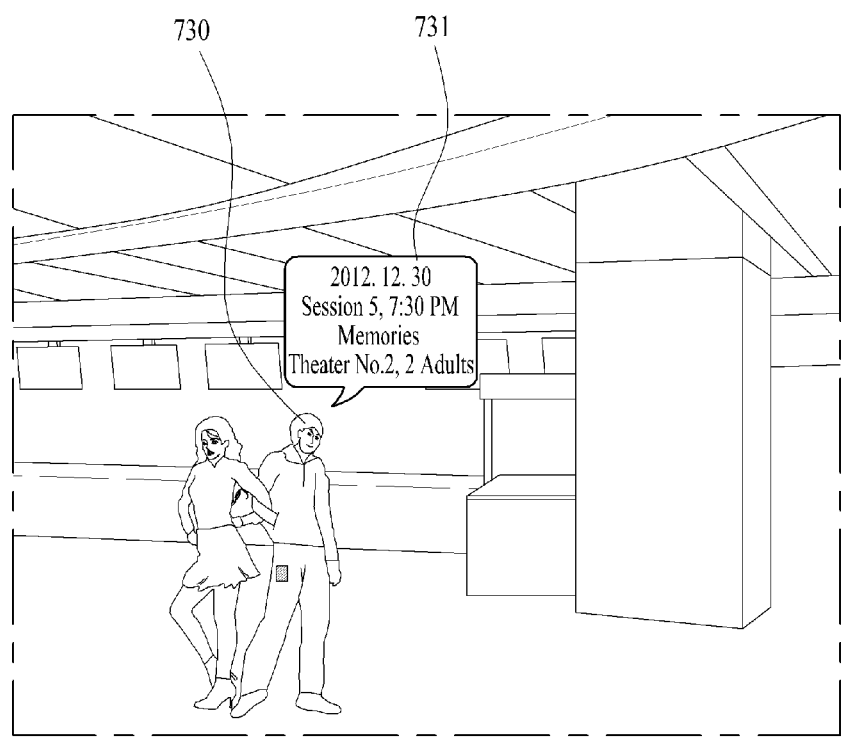

Therefore, when the HMD displays the object related to the external device, as shown in FIG. 7c, the HMD may display augmented reality information 731 associated with the ticket information in the surrounding area of the object 730 related to the external device.

In other words, as shown in FIG. 6c, when a user carries his external device in his pocket and enters the concert hall, movie theater, or boarding gate, as a packed group with another person, the HMD according to the exemplary embodiment of the present disclosure may accurately detect the person actually carrying the ticket and may, then, display the augmented reality information associated with the ticket information.

Meanwhile, according to the exemplary embodiment of the present disclosure the HMD may acquire the augmented reality information associated with the ticket information from a server, which has issued the corresponding ticket. The augmented reality information includes detailed information on the ticket purchased by the corresponding user. Herein, the HMD may receive the detailed information and may display the received detailed information on the real background and, most particularly, on the surrounding area of the user who has purchased the corresponding ticket. Accordingly, a user wearing the HMD may use the augmented reality information, so as to verify and check the corresponding ticket.

The augmented reality information associated with the ticket information may include ticket information or purchase history of the corresponding ticket. Additionally, the ticket information may include valid time information, place information, and identification information for distinguishing the ticket from tickets carries by other users.

Figure 8:
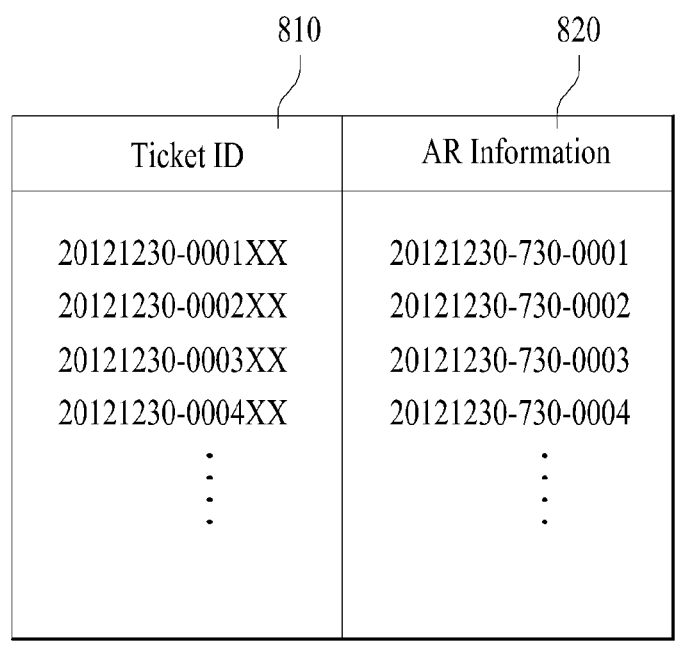
FIG. 8 illustrates exemplary augmented reality information matching with identification information of a ticket according to the exemplary embodiment of the present disclosure.

FIG. 8 illustrates exemplary augmented reality information matching with identification information of a ticket according to the exemplary embodiment of the present disclosure. As shown in FIG. 8, the augmented reality information 820 according to the present disclosure may be matched with identification information 810 of the ticket information. The identification information 810 of the ticket information is for distinguishing the ticket from other tickets, such as an ID of the issued ticket, a barcode number, and so on.

When the user aims at (or targets) a specific street or building by using the camera unit included in the HMD, the current position information acquired through a GPS receiver may be temporarily stored in the HMD. The HMD may transmit this position information to a position information system through the internet. Accordingly, the position information system may search through a database for detailed information associated with the transmitted position information. Thereafter, the position information system may transmit the searched result as a form of the augmented reality information to the HMD. After receiving the transmitted searched result, the HMD matches the received information with current map information and may show the result over a real-time display screen.

However, as described above, the augmented reality information according to the embodiment of the present disclosure is displayed based upon the identification information of the corresponding ticket, in addition to the position or image. Therefore, the augmented reality information according to the embodiment of the present disclosure is not displayed only at a specific position. Instead, as the external device having the corresponding ticket information stored therein moves, the position where the augmented reality information associated with the ticket information is displayed may also vary.

Most particularly, in case of a movie ticket, the issued tickets are checked in a movie theater. Herein, even if the ticket checking process is performed within the premises of the movie theater (i.e., indoors), if the external device having the corresponding ticket issued thereto does not exist, the augmented reality information associated with the corresponding ticket may not be displayed to the FWD. Thereafter, when the external device is detected to be inside the movie theater, the augmented reality information associated with the ticket information may then be displayed to the HMD.

Additionally, when the HMD is not assigned with the authority to check and verify the corresponding ticket, even if the corresponding external device is detected to exist in the movie theater, the corresponding ticket information is not displayed to the HMD. More specifically, this is because the HMD is required to request the external device for information, and also because the augmented reality information associated with the ticket information can be displayed only after receiving the response to the transmitted request.

Meanwhile, when the HMD displays the augmented reality information associated with the ticket information, the ticket agent wearing the HMD may verify whether or not the corresponding ticket is a valid ticket. When it is determined that the ticket is in fact valid, the HMD may transmit certification information to the external device.

Accordingly, when the HMD receives an input of the predetermined user, the HMD may determine the corresponding ticket as a valid ticket, and, then, the HMD may transmit the certification information to the external device. Alternatively, when the HMD detects the eyesight of the user focused on the displayed augmented reality information, the HMD may transmit the certification information to the external device. Alternatively, when the HMD receives the input of a predetermined user, or when the HMD detects the eyesight of the user, the HMD may transmit the ticket information received from the external device to a server, which has issued the corresponding ticket, and, then, the server may verify the validity of the corresponding ticket.

According to an exemplary embodiment of the present disclosure, the user may conveniently have his (or her) issued ticket checked and verified, while the user is carrying the external device having the corresponding ticket information stored therein in his (or her) pocket or handbag (or purse). However, when the user boards an airplane, a train, or a bus, or when the user enters a concert hall or a movie theater, the user may wish to verify whether or not his (or her) ticket has been properly verified and checked. Therefore, by transmitting certification information, the HMD may allow the user, which has purchased the corresponding ticket, to verify whether or not his (or her) ticket has been properly verified and checked, whenever he (or she) wishes.

Figure 9:
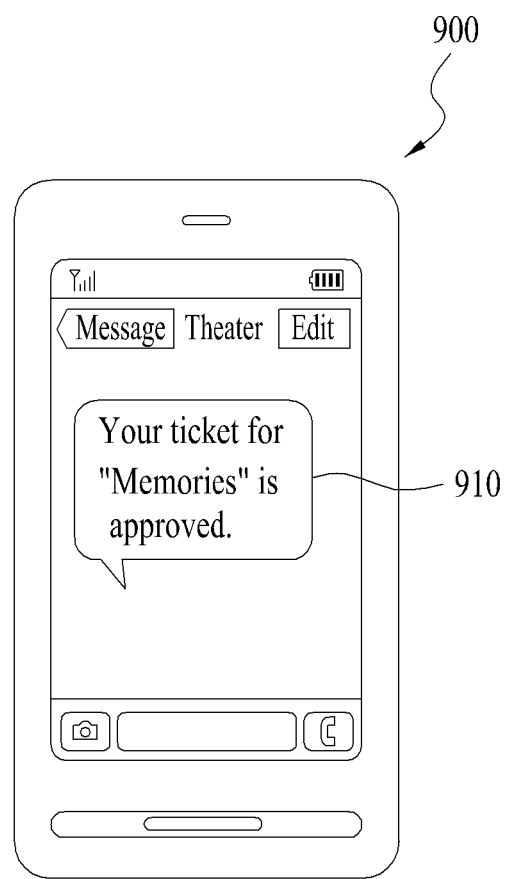
FIG. 9 illustrates an external device displaying received certification information according to the exemplary embodiment of the present disclosure.

FIG. 9 illustrates an external device displaying received certification information according to the exemplary embodiment of the present disclosure. By transmitting a message 910 indicating that the corresponding ticket is valid and that the ticket checking process is completed to the external device 900 in the form of an SMS, the user convenience may be enhanced.

Figure 10:
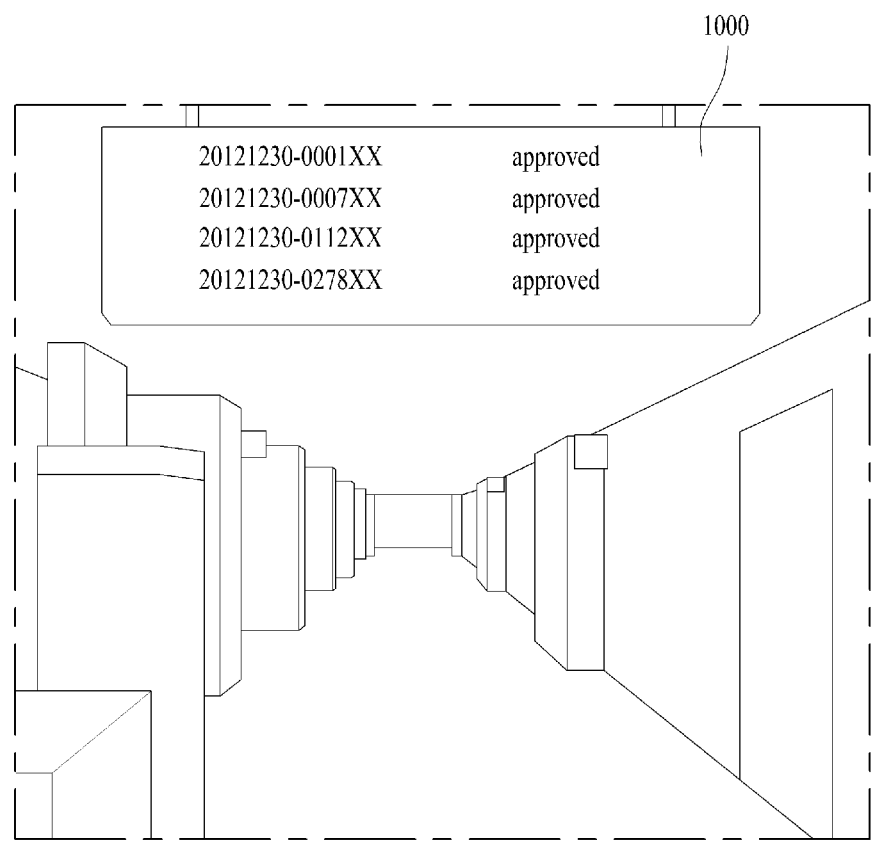
FIG. 10 illustrates an external device displaying received certification information according to another exemplary embodiment of the present disclosure.

FIG. 10 illustrates an external device displaying received certification information according to another exemplary embodiment of the present disclosure. According to the embodiment of the present disclosure, a user who has purchased a ticket may have his (or her) ticket checked by a ticket agent without having to take out his (or her) external device having the purchased ticket stored therein. Then, after the ticket has been verified and checked, the user may enter the concert hall, movie theater, or boarding gate. Accordingly, as described above with reference to FIG. 9, when the certification information is directly transmitted to the external device, the user being curious about the checking status of his (or her) ticket may eventually experience the inconvenience of having to take out his (or her) external device in order to verify the transmitted certification information. Accordingly, the HMD may display the certification information 1000 on a display device installed near the location where the ticket checking process is taking place, such as the entrance of a theater, a boarding gate, and so on. Thus, the user may verify that his (or her) ticket has been safely and properly verified and checked through the display device installed at the entrance, without having to take out his (or her) external device.

Additionally, as shown in FIG. 10, personal information of the user is not included in the displayed certification information. Therefore, only the user who is actually carrying the corresponding ticket may be capable of verifying that his (or her) ticket has been checked. As described above, the present disclosure is advantageous in that the user may be capable of verifying the approval of his (or her) ticket only without having to worry about any exposure of his (or her) personal information.

Meanwhile, an example where a ticket agent wearing the HMD detects an external device, which has ticket information stored therein, and where the HMD displays augmented reality information related to the ticket information, so that the ticket agent can verify and check the corresponding ticket, has been described above according to an exemplary embodiment of the present disclosure. However, the HMD may be connected with a server, which issues tickets, and an external device, which receives the issued ticket from the server, so as to configure a system. Accordingly, the functions that have been described above to be performed by the HMD may be performed in collaboration with other elements of the corresponding system. This will hereinafter be described in detail with reference to FIG. 11 to FIG. 12.

Figure 11:
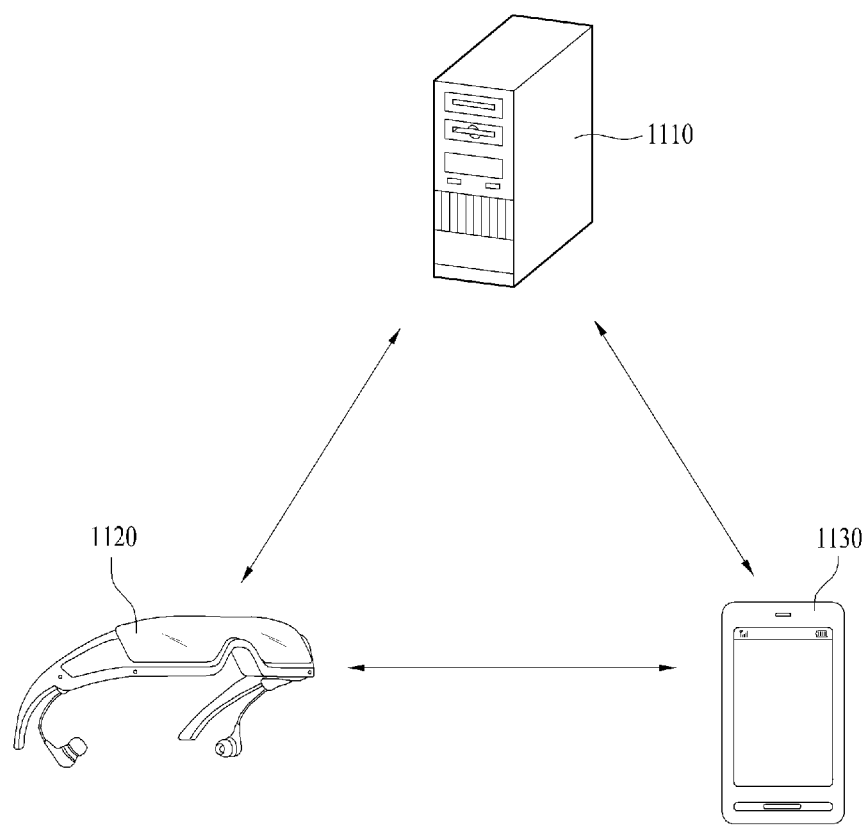
FIG. 11 illustrates a block view showing the structure of a ticketing system according to the exemplary embodiment of the present disclosure.

FIG. 11 illustrates a block view showing the structure of a ticketing system according to the exemplary embodiment of the present disclosure.

As shown in FIG. 11, the ticketing system may include a server 1110 configured to issue tickets, an external device 1130 configured to store the issued tickets, and an HMD 1120 configured to verify and check the issued ticket. Additionally, the server 1110, the HMD 1120, and the external device 1130 may transmit and receive data to and from one another through a wireless and/or wired network.

Additionally, multiple external devices 1130 storing the issued tickets, and multiple HMDs 1120 verifying and checking the issued tickets may exist in the ticketing system. Accordingly, a place where the tickets are checked and verify may correspond to a plurality of places, and multiple HMDs may check the tickets stored in multiple external devices at a specific place. Hereinafter, the flow of the data being processed by the elements configuring the ticketing system will be described in detail with reference to FIG. 12.

FIG. 12 illustrates a flow of the data being processed by the elements configuring the ticketing system according to the exemplary embodiment of the present disclosure.

When the server 1110 receives a request for issuing a ticket from the external device 1130 (S1200), the server 1110 may issue a ticket (S1210). Additionally, when the ticket is issued, the server 1110 may transmit the respective ticket information to the external device 1130 (S1220). Accordingly, the external device 1130 may use the receive ticket information, so as to have the ticket checked by a ticket agent.

Meanwhile, the ticket will not be limited only to a specific type of ticket. And, therefore, any type of ticket that can vouch for a user's right to enjoy a specific privilege, such as a ticket for boarding on a means of transportation, or a ticket for entering a particular place, such as a theater, may be verified and checked by the present disclosure. The server 1110 stores information on the issued ticket, so that a ticket agent can verify and check the stored ticket whenever necessary. Herein, the ticket information may include valid time information, place information, and identification information, so that the corresponding ticket can be differentiated from other tickets. And, the identification information may include a ticket ID or barcode number, which is uniquely assigned to each ticket.

Additionally, the server 1110 may store the ticket information along with augmented reality (AR) information, which is matched with the identification information of the corresponding ticket. The augmented reality information corresponds to information being displayed from the HMD 1120, which is worn by (or equipped to) a ticket agent. Herein, the augmented reality information may include ticket information or a ticket purchase history.

In addition to the characteristic of being displayed based upon a position and an image, the augmented reality information according to the present disclosure may be displayed based upon data, such as the identification information of the ticket. More specifically, instead of being displayed in accordance with a specific position and a specific image, the augmented reality information may be displayed at a time point when the identification information of the ticket is being requested or verified. Therefore, the time when the augmented reality information is being displayed, and the position (or place) where the augmented reality information is being displayed, may vary in accordance with when and where the identification information of the ticket is being requested.

Meanwhile, the ticket agent may wear the HMD 1120, so as to perform ticket checking tasks by using the augmented reality information associated with the ticket information that is displayed through the HMD 1120. Accordingly, the HMD 1120 may request at least one external device 1120, which is positioned in its surroundings, for information on the ticket that is to be checked (S1230). At this point, as described above with reference to FIG. 2, the HMD 1120 may request the ticket information by using a broadcast way.

After receiving the request for the ticket information, the external device 1130 may transmit the request ticket information to the HMD 1120 (S1240). Accordingly, after receiving the request for the ticket information, the external device 1130 may transmit the requested ticket information to the HMD 1120. Subsequently, only an HMD 1120 having the authority to check the corresponding ticket may receive the transmitted ticket information from the external device 1130. Therefore, the ticket information may not be unnecessarily transmitted to another irrelevant HMD or another irrelevant device.

Moreover, the HMD 1120 may request the server 1110 for the augmented reality information associated with the ticket information, which is received from the external device 1130 (S1250). Evidently, the HMD 1120 may store the augmented reality information associated with the ticket information in accordance with its settings or configuration method. However, when the HMD 1120 transmits a request to the server 1110 each time the corresponding information is required, system resource of the HMD 1120 may be efficiently used. At this point, the server issuing the tickets may be different from a server storing the augmented reality information associated with the ticket information.

Based upon the ticket information, which is received from the HMD 1120, the server 1110 may search for the identification information of the ticket information and may transmit the augmented reality information matching with the searched identification information to the HMD 1120 (S1260).

Meanwhile, in order to determine a position where the augmented reality information, which is received from the server 1110, is to be displayed, when the HMD 1120 requests the external device 1130 for position information (S1270), the external device 1130 may transmit the position information to the HMD 1120 by using a GPS signal, a wireless LAN signal, and so on (S1280). In case the ticket checking process is performed indoors, in case the ticket checking process is performed in a place where it is difficult to receive any GPS signals, a position difference of the external device 1130 may be reduced by using address information of the positions where the wireless LAN signal and the HMD 1120 are located.

Meanwhile, the HMD 1120 may acquire position information of the external device 1130 without requesting the external device 1130 for separate position information. For example, if the external device 1130 having a ticketing application installed therein enters a zone where the HMD 1120 checks the tickets, the position information of the external device 1130 may be automatically transmitted to the HMD 1120 through the installed ticketing application.

Additionally, as described above with reference to FIG. 4 to FIG. 6, when the HMD 1120 acquires position information of the external device 1130, the HMD 1120 may capture an image, and the HMD 1120 may detect an object related to the external device included in the captured image (S1290).

At this point, based upon the position information of the external device 1130, when it is determined that the external device 1130 is located within the angle of view zone of the HMD 1120, the MID 1120 may capture an image. Additionally, the HMD 1120 may capture an image, and information on the position and direction of the captured image is compared with position information of the external device 1130, so as to determine whether the external device 1130 is positioned within the angle of view zone of the HMD 1120. In order to do so, the HMD 1120 may use the absolute position information of the external device 1130, which is received from the external device 1130, so as to extract relative position information including at least one of distance information, direction information, and altitude information of an external device with respect to the position (or location) of the HMD 400.

Additionally, as described above with reference to FIG. 6, the HMD 1120 may convert the captured image to a gray format, and a borderline may be extracted from the converted image, so as to recognize an object based upon the extracted borderline. More specifically, the HMD 1120 may recognize an object with reference to a curved loop in the extracted borderline, and, then, the HMD 1120 may extract an object related to the form of a person. Moreover, the HMD may generate an identification area corresponding to the relative position information of the external device within the captured image, so as to detect and object including the identification area, or to detect an object adjacent to the identification area, thereby deciding the detected object as the object related to the external device 1130. Based upon the settings, the HMD may first decide the object including the identification area as the object related to the external device over the object adjacent to the identification area.

Moreover, the HMD 1120 may display augmented reality information associated with the ticket information on the surrounding area of the detected object (S1300). Accordingly, the ticket agent wearing (or being equipped with) the HMD 1120 may perform the ticket checking task by referring to the displayed augmented reality information.

When required, when the HMD 1120 detects the completion of the ticket checking process of the ticket agent, the HMD 1120 may transmit certification information to the external device 1130, or the HMD 1120 may display the certification information to another neighboring display device. Additionally, when the HMD 1120 transmits ticket information to the server for requesting the augmented reality information, the HMD 1120 may also transmit a request to determine the validity of the ticket. In other words, the HMD 1120 may only display the augmented reality information associated with the ticket information, and the ticket checking process may be performed by the server 1110. Then, the HMD 1120 may receive only the result of the ticket checking process. Accordingly, based upon the ticket checking result, which is received from the server 1110, a user wearing the HMD 1120 may be capable of detecting an external device that does not carry (or store) a purchased ticket, or an external device carrying an invalid ticket.

FIG. 13 illustrates a flow chart showing the process steps of a method for controlling the HMD according to the exemplary embodiment of the present disclosure. As described above, even if it is described that the HMD performs a specific function, the specific function may also be performed in collaboration with another element included in the ticketing system.

First of all, as described above with reference to FIG. 2, the HMD may request at least one external device for information on the ticket that is to be checked (S1310). The HMD may request the ticket information by using a broadcast way.

Among the at least one external devices receiving the request for the ticket information, the external device including the requested ticket information may respond to the request of the HMD. At this point, the external device may install an application for ticketing. Accordingly, the external device having the ticketing application installed therein may receive the request from the HMD and may then send a respective response to the HMD. Therefore, the HMD may receive a response including the requested ticket information from the external device (S1320).

Additionally, the HMD may acquire the augmented reality information associated with the ticket information (S1330). Herein, the augmented reality information may include ticket information and ticket purchase history. Moreover, as described above with reference to FIG. 8, the augmented reality information may be matched with the identification information of the ticket, which is included in the ticket information. Accordingly, the HMD may use the ticket information to request the server, which has issued the ticket, for the augmented reality information associated with the ticket information, or the HMD may store the augmented reality information in a storage unit.

Moreover, the HMD may capture an image in accordance with the angle of view zone (S1340). In order to display the ticket information as the augmented reality information, the HMD shall display the augmented reality information on an object related to the external device, which includes the ticket information. Accordingly, in order to decide the position where the augmented reality information is to be displayed, the HMD may detect the object related to the external device, wherein the object is included in the captured image (S1350). At this point, the captured image may correspond to a stereoscopic image (e.g., a 3D image), and the HMD may store depth information associated with the captured image.

As described above with reference to FIG. 5 to FIG. 6, the HMD may extract borderlines from the captured image and may recognize the object based upon the borderline forming a looped curve (or closed curve).

Additionally, as described above with reference to FIG. 7, the HMD may display the augmented reality information associated with the ticket information on the surrounding area of the detected object (S1360). Also, as described above with reference to FIG. 9, when the HMD detects the completion of the ticket agent's ticket checking procedure, the HMD may transmit certification information to the external device. At this point, when the HMD detects the eyesight of the ticket agent focused on the displayed augmented reality information, the HMD may determine that the ticket checking procedure is completed.

Furthermore, as described above in FIG. 10, when the HMD detects the completion of the ticket checking procedure of the ticket agent who is wearing the HMD, by displaying the certification information on a display device installed near the ticket agent, the user of the external device may be capable of easily verifying the ticket checking result.

Furthermore, although the drawings have been distinguished and divided in order to facilitate the description of the present disclosure, the present disclosure may be designed to form a new embodiment by combining some of the above-described embodiments of the present disclosure. Moreover, whenever required by anyone skilled in the art, the scope of the present disclosure includes designing a recording medium readable by a computer, the computer having a program for executing the above-described embodiments of the present disclosure recorded therein.

The HMD and the method for controlling the same according to the present disclosure may not be limited only to the above-described configuration and methods according to the exemplary embodiments of the present disclosure. Accordingly, variations of the exemplary embodiments of the present disclosure may be configured by selectively combining each exemplary embodiment of the present disclosure fully or in part.

Meanwhile, the method for controlling the HMD according to the present disclosure may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

As described above, the HMD and the method for controlling the same may have the following advantages. According to the embodiment of the present disclosure, since the user is not required to take out the ticket, which is stored in his (or her) external device, so as to personally show the purchased ticket to a ticket agent, the user may be capable of having his (or her) ticket checked more conveniently. Additionally, according to another embodiment of the present disclosure, since the ticket agent is equipped with the HMD, the ticket agent may be capable of checking tickets by referring to the augmented reality information, which is displayed at a position near a person carrying a portable external device having the corresponding ticket stored therein.

Moreover, according to yet another embodiment of the present disclosure, by providing the augmented reality information generated based upon the identification information associated with the purchased ticket, as long as the ticket information can be verified, the ticket checking procedure may be performed at any place by using the augmented reality information. Finally, according to a further embodiment of the present disclosure, when people are closely packed near one another, since the HMD according to the present disclosure is capable of accurately recognizing a person actually carrying the portable external device having the purchased ticket stored therein, the clarity of the augmented reality information may be enhanced.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents. It is also apparent that such variations of the present disclosure are not to be understood individually or separately from the technical scope or spirit of the present disclosure.

Also, a device and a method for controlling the device are both described in this specification of the present disclosure. Therefore, whenever required, the description of disclosure may be supplementarily applied.

What is claimed is:

1. A head mounted display (HMD), comprising:
a camera unit configured to capture an image;
a display unit configured to display augmented reality information;
a communication unit configured to transmit and receive data to and from an external device;
a sensor unit configured to sense a position of the HMD and to deliver the sensed position to a processor; and
the processor configured to control the camera unit, the display unit, the communication unit, and the sensor unit,
wherein the processor is further configured to:
control the communication unit to request ticket information from the external device,
control the communication unit to receive a response including the ticket information according to the request from the external device,
acquire augmented reality information associated with the ticket information, when the ticket information received by the communication unit from the external device is valid,
detect an object related to the external device in the image captured by the camera unit, and
control the display unit to display the augmented reality information associated with the ticket information on a surrounding area of the detected object.

2. The HMD of claim 1, wherein the processor acquires position information of the external device, and
wherein the processor extracts at least one of distance information, direction information, and altitude information of the external device with reference to a position of the HMD from the acquired position information of the external device.

3. The HMD of claim 2, wherein the processor receives the position information according to a global positioning system (GPS) from the external device or acquires the position information by using wireless LAN signal information of the external device and an address information where the HMD is positioned.

4. The HMD of claim 2, wherein the processor captures an image, when the processor detects that the external device is located within an angle of a view zone of the HMD according to the position information of the external device.

5. The HMD of claim 2, wherein the processor detects an object related to the external device in the captured image by using at least one of the distance information, direction information, and altitude information of the external device.

6. The HMD of claim 2, wherein the captured image includes a three-dimensional (3D) image, and wherein the processor extracts depth information of at least one object included in the captured image.

7. The HMD of claim 6, wherein the processor detects an object related to the external device in the captured image by using the depth information and at least one of the distance information, direction information, and altitude information of the external device.

8. The HMD of claim 2, wherein the processor generates an identification area corresponding to a position of the external device within the captured image by using at least one of distance information, direction information, and altitude information of the external device, and wherein the processor detects an object including the identification area or an object neighboring the identification area.

9. The HMD of claim 1, wherein the processor converts a format of the captured image to a gray mode, extracts a borderline from the converted image, and recognizes an object based on the extracted borderline.

10. The HMD of claim 9, wherein the processor recognizes an object based on a looped curve from the extracted borderline.

11. The HMD of claim 1, wherein the processor requests the ticket information to at least one external object by using a broadcast way.

12. The HMD of claim 1, wherein the ticket information includes valid time information of the ticket, place information of the ticket, and identification information for distinguishing the ticket from other tickets, and
wherein the augmented reality information is matched with the identification information.

13. The HMD of claim 1, wherein the augmented reality information includes the ticket information or a ticket purchase history.

14. The HMD of claim 1, wherein the processor acquires the augmented reality information from a server that has issued the ticket.

15. The HMD of claim 1, wherein the processor transmits certification information to the external device, when the ticket information is valid.

16. The HMD of claim 15, wherein the processor transmits the certification information, if the processor detects an eyesight of a user focused on the displayed augmented reality information.

17. A method for controlling a head mounted display (HMD), the method comprising:
requesting, by a communication unit in the HMD, ticket information from an external device;
receiving, by the communication unit, a response including the ticket information according to the request from the external device;
acquiring, by a processor in the HMD, augmented reality information associated with the ticket information, when the ticket information received by the communication unit from the external device is valid;
capturing, by a camera unit in the HMD, an image;
detecting, by the processor, an object related to the external device in the image captured by the camera unit; and
displaying, by a display unit in the HMD, the augmented reality information associated with the ticket information on a surrounding area of the detected object.

18. The method of claim 17, further comprising:
acquiring, by the processor, position information of the external device; and
extracting, by the processor, at least one of distance information, direction information, and altitude information of the external device with reference to a position of the HMD, based on the acquired position information of the external device.

19. The method of claim 17, wherein the detecting the object comprises:
converting, by the processor, a format of the captured image to a gray mode;
extracting, by the processor, a borderline from the converted image;
recognizing, by the processor, an object based on a looped curve from the extracted borderline;
detecting, by the processor, an identification area corresponding to a position of the external device within the captured image by using at least one of the distance information, direction information, and altitude information of the external device; and detecting, by the processor, an object including the identification area or an object neighboring the identification area.

* * * * *